Oct. 4, 1955  H. D. BRAILSFORD  2,719,944
COMMUTATORLESS DIRECT CURRENT MOTOR
Filed June 10, 1954  2 Sheets-Sheet 1

INVENTOR.
Harrison D. Brailsford
BY Darby + Darby
ATTORNEYS

INVENTOR.
Harrison D. Brailsford
BY Darby + Darby
ATTORNEYS

United States Patent Office 2,719,944
Patented Oct. 4, 1955

2,719,944
COMMUTATORLESS DIRECT CURRENT MOTOR

Harrison D. Brailsford, Rye, N. Y.

Application June 10, 1954, Serial No. 435,759

12 Claims. (Cl. 318—254)

The present invention relates to a direct current motor and more particularly to such a motor which requires no commutator, make or break contacts, or vibrating contacts.

More particularly still the invention relates to a direct current motor having transistors in the field winding circuits thereof which transistors perform the commutating function. By means of this use of transistors the conventional commutating means are eliminated and the life of the motor is greatly increased, since that life is normally limited by the commutator device the parts of which are necessarily made of soft highly conductive metals. With the present motor these parts are eliminated and the life is limited substantially only by the life of the mechanical bearings which support the motor shaft.

It is an object of the invention to provide a direct current electric motor in which no moving conductors are employed.

It is another object of the invention to provide such a motor which does not utilize any moving contacts.

It is another object of the invention to provide a motor as above mentioned which is inherently incapable of producing radio frequency interference.

It is a further object of the invention to provide such a motor which is reversible without the necessity of changing the polarity of the supply voltage.

It is a still further object of the invention to provide a device as mentioned above which, in addition to functioning as an electric motor, also may function as a direct to alternating current inverter and as a direct current driven oscillator or alternator.

It is a still further object of the invention to provide a direct current motor of the type mentioned above having a constant speed characteristic and which has zero stall current.

Figure 1:
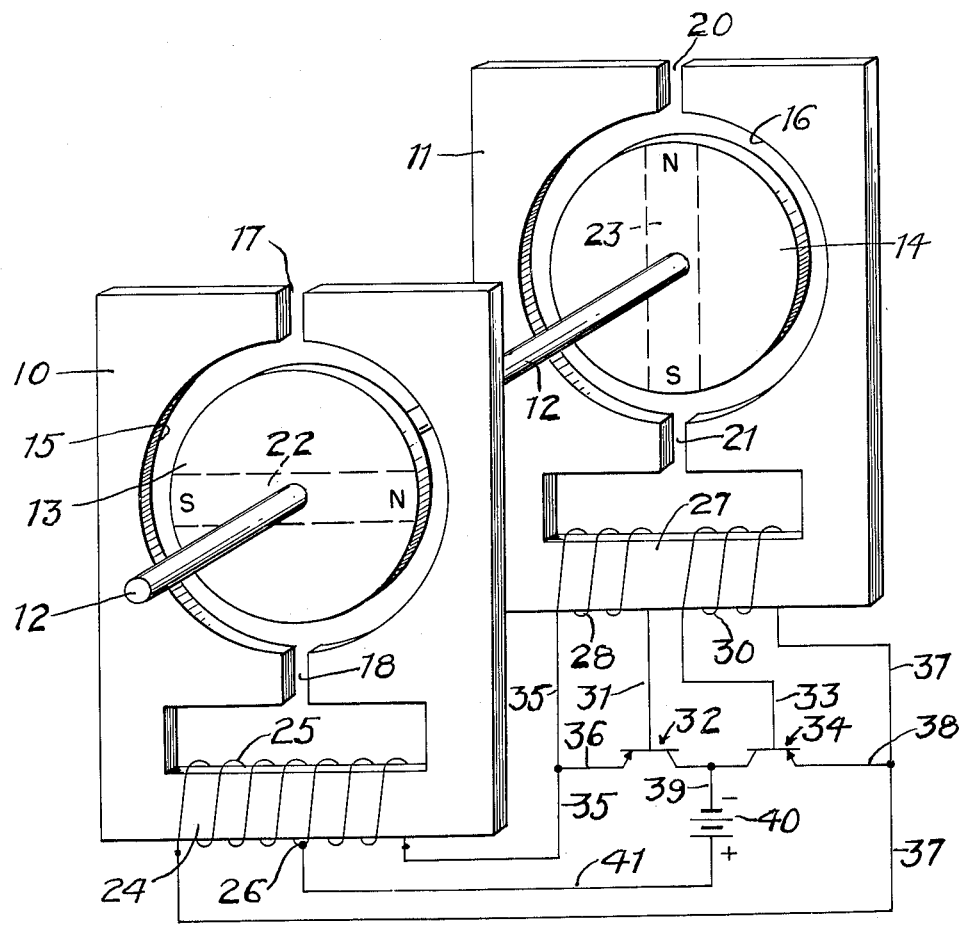
Figure 2:
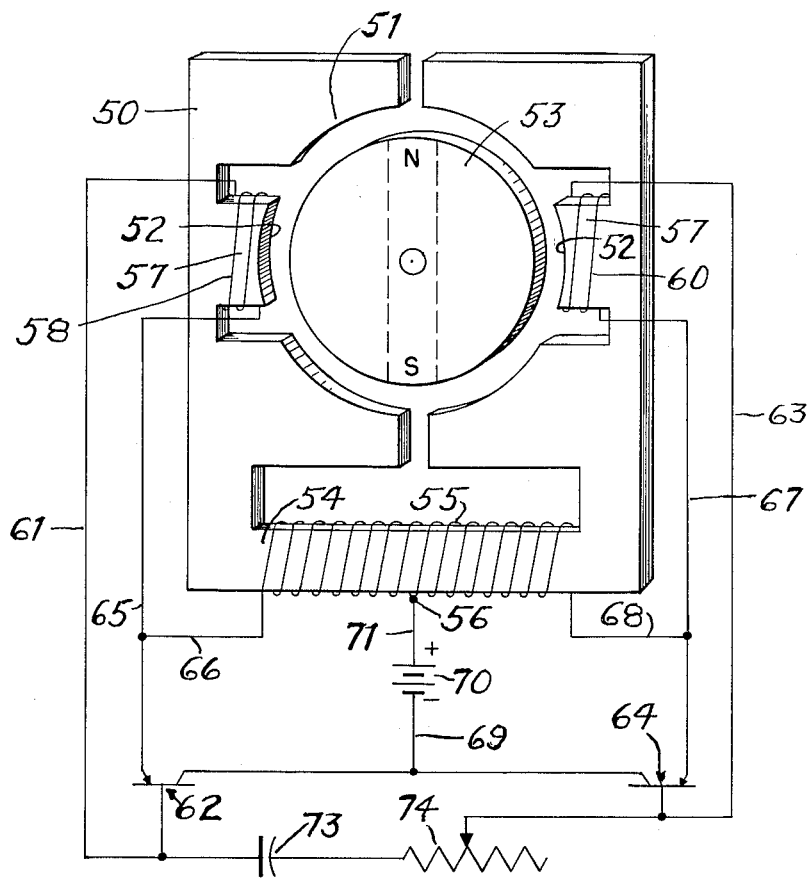

Other objects and features of the invention will be apparent when the following description is considered in connection with the annexed drawings, in which, Figure 1 is a schematic perspective view of one form of the motor of my invention; and Figure 2 is a similar schematic perspective view of a second embodiment of the motor of my invention.

Referring now to the drawings, the motor comprises two soft iron pole pieces 10 and 11. Mounted on a shaft 12 are the two Alnico disks 13 and 14, the disk 13 being mounted concentrically in a circular opening 15 in the pole piece 10 and the disk 14 being similarly mounted concentrically in the circular opening 16 in the pole piece 11. The pole piece 11 is provided with the pole gaps 17 and 18 and the pole piece 11 is in like manner provided with gaps 20 and 21.

The disks 13 and 14 are magnetized on a diametrical band as indicated at 22 and 23 respectively, the disks being mounted on shaft 12 so that the bands 22 and 23 extend at right angles to each other.

Wound on a core portion 24 of the pole piece 10 is a coil 25 which is center tapped at 26. Wound upon a core portion 27 of the pole piece 11 are two coils 28 and 30. One end of the coil 28 is connected by means of conductor 31 to the base of a transistor 32 the transistor being of the P. N. P. type. The electrically opposite end of the coil 30 is connected by means of a conductor 33 to a second transistor 34 of the same type.

The opposite terminal of winding 28 is connected by means of conductors 35 and 36 to the emitter of the transistor 32 and also through conductor 35 alone to the right hand terminal of the winding 25. In a like manner the opposite or right hand terminal of winding 30 is connected by means of conductors 37 and 38 to the emitter of the transistor 34 and also by means of conductor 37 alone to the left hand terminal of the winding 25. The collector terminals of the transistors 32 and 34 are joined and connected by means of conductor 39 to the negative pole of the battery 40, the positive pole of which is connected by means of conductor 41 to the center tap 26 of winding 25.

The device described above operates in the following manner. When the motor is at rest no current flow results since with the polarities indicated the transistors 32 and 34 reflect a high impedance. If it be assumed that the shaft 12 is rotated in the clockwise direction by a small amount, it will be seen that a current is induced in the coil 30. This current flows in such a direction as to put a negative bias on the base of the transistor 34 thereby rendering that transistor conducting. As a result, current flows from the positive pole of the battery 40 through conductor 41 the left half of winding 25 and thence through conductors 37 and 38 to the emitter terminal of transistor 34 and through the transistor and conductor 39 to the negative pole of the battery. As long as negative polarity is maintained on the base of the transistor 34 this condition will prevail.

Current flowing through the left half of the coil 25 causes magnetization of the pole piece 10 in a direction to produce a clockwise torque on the Alnico disk 13, this torque resulting from cooperation of the magnetization of the pole structure with the permanent field present due to the magnetization of the band 22 as above described.

Rotation of the disk 13 is of course effective to similarly rotate the disk 14 and this disk shortly passes its phase position of maximum flux. At this time the negative bias on the base of transistor 34 is removed due to the collapse of the field strength through the pole piece 11 and the transistor 34 becomes non-conducting. Rotation of the disks 13 and 14 continues due to inertia until the disk 14 reaches a position where a negative bias is applied to the base of the transistor 32. This transistor consequently becomes conducting and a current flows from the positive pole of battery 40 through conductor 41, the right half of winding 25 and conductors 35 and 36 to the emitter terminal of transistor 32, thence through the transistor and collector terminal thereof and conductor 39 to the negative pole of battery 40. This results in a rotational pulse being applied to the disk 22 and shaft 12 and the shaft then continues to rotate due to inertia effect until the magnetized band 23 of the disk or rotor 14 again induces a current in the coil 30 which renders the transistor 34 conducting. There are thus two power pulses per revolution when the two-pole arrangement of Figure 1 is utilized although it will be understood that by adding pole pieces, windings and controlling transistors the number of power pulses per revolution may be varied at will.

The device as described is manually started and, as is apparent, will rotate in either direction depending only upon the direction in which it is started. Various conventional methods of self-starting can be employed which are so well known that description thereof is unnecessary.

Referring now to Figure 2 there is shown in that figure a modified form of my invention which operates in the same general manner as that of Figure 1. The construction, however, is slightly different and therefore a description thereof follows.

A soft iron pole piece 50 similar to the pole piece 10 is provided, the circular opening thereof, however, being modified to provide the pole faces 51 and the auxiliary pole faces 52. With this arrangement a single rotor 53 exactly like the rotor 13 is provided and a center tapped coil 55 is wound upon a core portion 54 in exactly the same manner that the coil 25 is wound upon the core portion 24, the winding 55 being center tapped at the point 56.

The core portions 57 replace the core portion 27 of the second pole piece 11 and each of these has a winding 58 or 60 wound thereon. Winding 58 is connected by means of conductor 61 to the base of a transistor 62. Winding 60 is similarly connected by means of conductor 63 to the base of a transistor 64, the arrangement being exactly similar to that of the transistors 32 and 34. Likewise the other terminal of winding 58 is connected by means of conductors 65 and 66 to the left hand terminal of winding 55 and directly through conductor 65 to the emitter of the transistor 62; and the remaining terminal of winding 60 is connected by means of conductors 67 and 68 to the right hand terminal of winding 55 and through conductor 67 alone to the emitter of transistor 64. The collector terminals of transistors 62 and 64 are joined together and connected by means of a conductor 69 to the negative pole of battery 70, the positive pole of which is connected by means of the conductor 71 to the center tap 56 of the winding 55.

The motor of Figure 2 may be operated at a predetermined constant speed despite a substantial range of variation in the output voltage of battery 70. This is accomplished by the use of a condenser 72 and variable resistor 74 connected in series relationship across the bases of the transistors 62 and 64. Although this arrangement is not shown in Figure 1, it will be understood that a similar condenser resistor combination may be connected across the bases of the transistors 32 and 34 of that figure.

The motor of Figure 2 operates in substantially the same manner as does the motor of Figure 1. When the rotor disk 53 moves into a position such that flux is generated in the winding 60 a negative bias voltage is impressed upon the base of transistor 64. Also a portion of this bias voltage is transmitted through resistor 74 and condenser 73 to the base of the transistor 62. Since transistors 64 and 62 are oppositely phased, if at this instant the transistor 64 is delivering current to the right half of winding 55 of proper polarity to cause the motor to run, then conduction through transistor 62 and the left hand half of coil 55 will tend to oppose rotation of the rotor 53. It will be apparent that the proportion of the bias voltage on transistor 64 which reaches transistor 62 will be a function of the frequency which is of course a direct function of the speed of the rotor 53 as well as of the capacitance of the condenser 73 and the value of the resistor 74. The greater the capacitance the greater the bucking voltage for any given frequency and the greater the frequency the greater is the bucking voltage for a given capacitance. The resistor 74 may thus be used as a convenient means for adjusting the speed of operation.

The resistor 73 and capacitor 74 are, of course, adjusted so that the opposing bucking voltage generated through the second of the pair of transistors is less than the driving voltage and therefore, under the conditions assumed, current through the right half of winding 55 causes the rotor to be given a pulse which, together with the inertia, carries it to a position wherein flux is generated in the winding 58. This results in the current through transistor 62 becoming greater than that through the transistor 64 and provides a current through the left hand half of winding 54 greater than that through the right hand half. As a result the rotor is again provided with a rotational impulse which returns it to a position in which the first described condition obtains. Thus the motor continues to rotate being provided with two driven impulses per revolution, the speed of rotation being determined, as stated above, by the adjustment of the resistor 74.

As before, the device may be provided with a greater number of poles and corresponding circuits so that additional power impulses are obtained during each revolution. If desired, a single operating winding and a single transistor may be utilized to provide a single power impulse per revolution, this likewise applying to both disclosed forms of the invention.

It will be obvious that in either embodiment described no stall current can exist since as soon as the rotor stops no flux is generated and the bias is removed from the transistors thus preventing current flow in the field windings.

Moreover by connecting an external load across the center tapped winding such as 25 or 55 an alternating voltage is supplied to that load and thus the device may readily be utilized as a D. C. to A. C. inverter.

While I have described preferred embodiments of my invention it will be understood that many other modifications may be made without departing from the spirit of my invention. I wish therefore to be limited not by the foregoing description but, on the contrary, solely by the claims granted to me.

What is claimed is:

1. A direct current electric motor comprising, in combination, a stationary electromagnetic field structure, a permanently magnetized bar mounted for rotation within the said field structure, at least one driving winding on a core portion of said field structure, at least one control winding on a core portion of said field structure, and a circuit including a source of direct current, at least one transistor connected with its emitter-collector terminals in series with said driving winding, and its base terminal connected to said control winding, said transistor being rendered conductive by the current induced in said control winding in response to rotation of said bar to supply current from said source to said driving winding to thus produce magnetic pulses in said field structure for rotating said rotor bar.

2. A direct current motor as claimed in claim 1, characterized in that cessation of rotation causes said transistor to become non-conducting thereby reducing the current in said driving winding to zero.

3. A direct current motor as claimed in claim 1, characterized in that said motor operates in either direction depending solely upon the direction of rotation initially imparted thereto.

4. A direct current motor as claimed in claim 1, characterized in that said current flowing in said driving winding is alternating and a load may be connected across said winding, said motor then serving as a direct to alternating current inverter.

5. A device as claimed in claim 1, characterized in that said driving windings comprise two oppositely poled windings, said control windings comprise two oppositely poled windings and a pair of transistors is provided, the bases of said transistors being connected to said control windings individually to render the transistors individually conductive by flux generated in said windings, the collector terminals of said transistors being individually connected to said driving windings to produce flow of current therethrough when said corresponding transistors are rendered conductive.

6. A motor as claimed in claim 1, characterized in that said control windings comprise a pair thereof, said transistors comprise a pair thereof, said transistors having the bases thereof individually connected to said control windings, the collector terminals of said transistors being connected together and to the negative terminal of a source of direct current, said driving windings comprise a pair each having one terminal thereof connected individually to the emitter terminal of one of said transistors, the other terminals of said driving windings being connected together and to the positive terminal of the said source of direct current whereby rotation of said bar generates a magnetic flux in said control windings selectively placing a negative bias on the corresponding one of said transistors thereby rendering said transistor conductive and supplying current from said source to a corresponding one of said driving windings to further rotate said rotor bar.

7. A device as claimed in claim 6, characterized in that a resistance element and a capacitance element in series connection are connected across the transistor bases, at least one of said elements being adjustable whereby the speed of said motor may be adjusted and maintained at a constant value.

8. A direct current electric motor comprising, in combination, a pair of soft iron pole pieces each having gaps therein and central cylindrical openings therethrough, a shaft extending through the central openings of said pole pieces, a pair of rotors, one mounted on said shaft in the plane of each said pole piece, said rotors being at a 90° angle to each other, each said rotor comprising a disk having a diametrical portion thereof magnetized to produce opposite poles at the ends of said diameter, a center tapped coil wound on a core portion of the first of said pole pieces, a pair of coils wound on a core portion of the second of said pole pieces, a transistor having its base and emitter terminal connected across each of the coils of said pair, means joining the collector terminals of said transistors, a source of direct current means connecting said joined collector terminals to the negative pole of said source, means connecting the positive pole of said source to the center tap of said coil on said first pole piece, and means connecting each of the remaining terminals of said center tapped coil to the emitter terminal of a corresponding one of said transistors whereby the rotation of said first rotor generates current in said pair of coils to negatively bias one of said transistors and render it conductive, thereby permitting flow of current from said source through one-half of the coil on said first pole piece to impart a magnetic driving pulse to said first rotor and through said shaft to said second rotor, said rotation rendering said transistors alternately conductive and producing driving pulses in the halves of said coil on said first pole piece alternately to cause continuing rotation.

9. A direct current motor comprising, in combination, a soft iron pole piece, said pole piece having a plurality of pole faces, a central opening through said pole piece, said central opening being concentric with respect to said pole faces, a shaft extending through said central opening, a rotor mounted on said shaft in the plane of said pole piece, said rotor comprising a disk having a diametrical portion thereof magnetized to produce opposite poles at the ends of said diameter, a center tapped coil wound on a core portion of said pole piece, a pair of coils wound on core portions of said pole piece spaced 180° apart and alternating with said first-mentioned pole faces, a pair of transistors each having its base and emitter terminal connected across one of the coils of said pair, means joining the collector terminals of said transistors, a source of direct current, means connecting said joined collector terminals to the negative pole of said source, means connecting the positive pole of said source to the center tap on said center tapped coil and means connecting each of the remaining terminals of said center tapped coil to the emitter terminal of a corresponding one of said transistors, whereby rotation of said rotor produces a flux in said core and the corresponding current in said pair of coils to negatively bias one of said transistors and render it conductive, thus permitting current flow from said source through one-half of said center tapped coil to impart a driving pulse to said rotor.

10. A device as claimed in claim 9, characterized in that said transistor bases are connected together by means of a series connected resistor and capacitor, said resistor-capacitor combination serving to bias the second of said transistors to render it conductive to a lesser extent than said first transistor thereby producing a bucking voltage in the other half of said center tapped coil and regulating the speed of rotation of said rotor.

11. A device as claimed in claim 10, characterized in that said resistor is adjustable thereby rendering the speed of said motor adjustable at will.

12. A direct current electric motor comprising, in combination, a stationary electromagnetic field structure, a permanently magnetized bar mounted for rotation within the said field structure, at least one driving winding on a core portion of said field structure, at least one control winding on a core portion of said field structure, and a circuit including a source of direct current and at least one transistor connected to said driving and control windings, said transistor being rendered selectively conductive in response to rotation of said bar to supply current from said source to said driving winding periodically to thus produce magnetic pulses in said field structure to cause rotation of said rotor bar.

References Cited in the file of this patent

UNITED STATES PATENTS

| 1,563,084 | Harris | Nov. 24, 1925 |
| 1,992,826 | Karasawa | Feb. 26, 1935 |
| 2,457,631 | Brailsford | Dec. 28, 1948 |
| 2,648,786 | Knitter | Aug. 11, 1953 |

FOREIGN PATENTS

| 624,431 | France | Apr. 9, 1927 |